United States Patent
Holm et al.

(10) Patent No.: US 10,555,500 B2
(45) Date of Patent: Feb. 11, 2020

(54) DRINKING BUCKET

(71) Applicants: Hans Joachim Holm, Westerrönfeld (DE); Hans-Joachim Laue, Osterrönfeld (DE)

(72) Inventors: Hans Joachim Holm, Westerrönfeld (DE); Hans-Joachim Laue, Osterrönfeld (DE)

( * ) Notice: Subject to any disclaimer, the term of this patent is extended or adjusted under 35 U.S.C. 154(b) by 179 days.

(21) Appl. No.: 15/906,452

(22) Filed: Feb. 27, 2018

(65) Prior Publication Data
US 2018/0271057 A1 Sep. 27, 2018

(30) Foreign Application Priority Data
Mar. 1, 2017 (DE) .................. 10 2017 104 217

(51) Int. Cl.
*A01K 9/00* (2006.01)

(52) U.S. Cl.
CPC ...................... *A01K 9/00* (2013.01)

(58) Field of Classification Search
CPC ........ A01K 9/00; A01K 5/0216; A01K 7/022; A01K 7/06; A01K 9/005
USPC .............. 119/71, 72, 475, 515, 454
See application file for complete search history.

(56) References Cited

U.S. PATENT DOCUMENTS

| | | | | |
|---|---|---|---|---|
| 4,993,365 A * | 2/1991 | Weerstra | .................. | A01K 9/00 119/51.02 |
| 5,551,374 A * | 9/1996 | Wells | ........................ | A01K 9/00 119/57.92 |
| 6,016,769 A * | 1/2000 | Forster | ................. | A01K 5/0216 119/71 |
| 6,360,691 B1 * | 3/2002 | Laue | ..................... | A01K 5/0216 119/57.92 |
| 2006/0201435 A1 * | 9/2006 | Arnerup | ................. | A01K 7/022 119/71 |
| 2010/0224131 A1 * | 9/2010 | Lee | ......................... | A01K 9/00 119/71 |
| 2015/0351364 A1 | 12/2015 | Holm et al. | | |
| 2016/0135425 A1 * | 5/2016 | Holm | ....................... | A01K 9/00 119/71 |
| 2017/0295752 A1 * | 10/2017 | Evans | ..................... | A61J 9/005 |

FOREIGN PATENT DOCUMENTS

| | | |
|---|---|---|
| DE | 202013011562 U1 | 3/2014 |
| DE | 102016114137 B3 | 8/2017 |
| EP | 2952092 A1 | 9/2015 |
| EP | 1897438 B1 | 5/2017 |

OTHER PUBLICATIONS

EP 18158198.4; filed Feb. 22, 2018; EP Search Report dated Jun. 13, 2018; 8 pages.

* cited by examiner

*Primary Examiner* — Yvonne R Abbott-Lewis
(74) *Attorney, Agent, or Firm* — Barclay Damon LLP

(57) ABSTRACT

A drinking bucket for feeding livestock a liquid food comprises a holding area configured to hold the liquid food, the holding area further configured to connect to at least one teat. An activity sensor for detecting sucking activity on the at least one teat is connected to an electronic control and configured to evaluate signals from the activity sensor and at least one of a remote data transmission apparatus and a display apparatus connected to the electronic control.

15 Claims, 2 Drawing Sheets

DRINKING BUCKET

CROSS REFERENCE TO RELATED INVENTION

This application is based upon and claims priority to, under relevant sections of 35 U.S.C. § 119, German Patent Application No. 10 2017 104 217.2, filed Mar. 1, 2017, the entire contents of which are hereby incorporated by reference.

BACKGROUND

The invention relates to a drinking bucket for feeding livestock a liquid food. Such drinking buckets are used for livestock husbandry, in particular for feeding calves whole milk or milk substitutes. The drinking bucket has a teat that the livestock can use to drink at any time. These can be used very easily and flexibly. In particular, an appropriate number can be attached to or in calf pens and filled and cleaned very easily.

In comparison to other more involved forms of feeding such as with fully automated feeders, however, drinking buckets, after being filled, do not offer any control over the use of the feed.

BRIEF SUMMARY OF THE INVENTION

Against this backdrop, the object of the invention is to provide a drinking bucket that allows more control over the actual use of the feed.

The disclosed drinking bucket serves to feed livestock a liquid food and comprises a holding area for holding the liquid food, at least one teat that is connected to the holding area of the drinking bucket so that livestock can drink the food located in the holding area at any time, an activity sensor for detecting sucking activity, an electronic control, and a remote data transmission apparatus and/or display apparatus connected to the electronic control. The electronic control is connected to the activity sensor and is designed to evaluate signals from the activity sensor and transfer or transmit activity information via the remote data transmission apparatus and/or display activity information on the display apparatus.

In an embodiment, the drinking bucket can comprise a main body in the shape of a conventional carrying bucket and a lid, and can be provided with a single teat. A different drinking bucket shape is also possible, for example in the design of a small trough. In particular in this case, it can be useful to provide the drinking bucket with a plurality of teats so that a plurality of livestock can drink at the same time. It is also possible to use a drinking bucket that is cylindrical or rectangular and/or has the shape of a large drinking bottle. Accordingly, the volume of the holding area can differ and, for example, lie within a range of 2 liters to 80 liters. In many cases, the volume of the holding area lies within a range of 5 liters to 20 liters. The drinking bucket can have an attachment apparatus for attaching to a grating or a wall of a calf pen, for example in the shape of attachment openings.

In an embodiment, the drinking bucket comprises thermal insulation, for example in the form of a layer consisting of a thermally insulating material that surrounds a layer bordering the holding area.

In an embodiment, information on sucking activity is obtained with the assistance of the activity sensor and the electronic control and is transferred or transmitted with the assistance of the remote data transmission apparatus, in particular to a central location such as a feeding management system. Alternatively or in addition, the sucking activity information can be displayed by a display device of the drinking bucket. The activity sensor can be any sensor the signals of which permit conclusions about sucking activity of an animal at the drinking bucket.

This makes it possible to collect and evaluate the sucking activity information. In particular, it can be determined whether the animals provided with the drinking bucket are accepting the food in the usual manner. More relevant insights can be obtained by evaluating the progression over time of the sucking activity, in particular on the drinking behavior and/or the health of the livestock provided with the drinking bucket.

In an embodiment, the drinking bucket can have a display apparatus that is connected to the electronic control and that displays the sucking activity information. In the simplest case, the display apparatus can be a single light, in particular an LED. The display apparatus can also display textual information and/or graphic symbols. With the assistance of the display apparatus, information on the fill level, for example, can be displayed directly. It is also possible to use the display apparatus as a warning signal, in particular if the sucking activity information determined by the electronic control indicates sucking behavior different from expectations. It is particularly advantageous if this warning signal is displayed directly on the drinking bucket so that an individual who, for example, passes by to fill the drinking bucket can check the health status of the animals with particular care.

In one embodiment, the electronic control is configured to transfer or transmit and/or display the sucking activity information at given points in time, at given time intervals, and/or upon request. These measures contribute to the fact that continuously current data are available at the display apparatus or a central location to which the information is transferred.

In one embodiment, the drinking bucket has a battery for supplying energy to the electronic control and for supplying energy to the remote data transmission apparatus and/or the display apparatus. This allows the drinking bucket to be operated as an independent unit despite its expanded functionality. In particular, a cable does not have to be run or connected to the drinking bucket.

In one embodiment, the activity sensor is a fill level sensor for detecting a fill level of the liquid food in the holding area. In this case, the detected fill levels are the foundation for the sucking activity information. In the simplest case, any change in the fill level detected by the fill level sensor indicates sucking activity, and the transmitted and/or displayed sucking activity information substantially consists of the information that sucking activity was detected. It is, however, also possible to transmit and/or display the detected fill level information itself or other information derived therefrom as sucking activity information.

In one embodiment, the fill level sensor has a distance meter configured to detect the fill level in the holding area in any manner, for example with the assistance of one or more fill level electrodes, by detecting a scale arranged in the holding area, or with the assistance of a float. Preferably, the fill level is, however, measured using a distance meter that can detect the distance to a liquid level of the liquid food contact-free. For example, the distance meter can be an optical or an acoustic distance meter. The distance can be based on a propagation time measurement, according to the principal of triangulation, or according to another measuring principle.

In one embodiment, the activity sensor is an acceleration sensor. With the acceleration sensor, accelerations, in particular vibrations, movements and/or a position of the drinking bucket can be detected. For example, a drinking process by a calf at the teat typically leads to jerking movements of the teat or respectively the drinking bucket. The sucking activity information obtained on the basis of the acceleration sensor signals can substantially consist of the information that a drinking process was detected. However, a more differentiated evaluation of the signals is also possible that, for example, makes it possible to indicate a frequency of the sucking process. The corresponding information can be transferred or transmitted by the remote data transmission apparatus and/or displayed by the display apparatus. It provides information on the activity and behavior of the livestock. Detecting the position of the drinking bucket can moreover provide information on whether or not the drinking bucket is in its intended arrangement, for example if it has been tipped over.

Of course, the drinking bucket can also have two or three of the activity sensors: the fill level sensor, acceleration sensor and force transducer. In this case, based on the plurality of activity sensors, a plurality of different types of sucking activity information can be transferred or transmitted and/or displayed, and/or more complex information can be compiled.

In one embodiment, the activity sensor is a force transducer. For example, a flexible rod or a load cell can be used to detect force acting on the drinking bucket. In this manner, forces exerted by the aforementioned jerky movements can be detected and evaluated. In this regard, the force transducer can be arranged, for example, between the drinking bucket and a wall holder to which the drinking bucket is attached. This yields similar evaluation options as explained above with regard to the acceleration sensor. An arrangement of the force transducer is also possible such that it detects weight acting on the drinking bucket. In this case, fill level information can be derived from the signals of the force transducer and used as explained in the context of the fill level sensor.

In one embodiment, the drinking bucket comprises a mounting bracket on which the drinking bucket is elastically suspended in a resting position, and the activity sensor is configured to detect a deflection from the resting position. The mounting bracket can have a first part to which the drinking bucket is attached, for example by being hung, and a second part that is attached to a wall such as a wall of a calf pen. The first part can be displaced relative to the second part against the force of a spring or another element that can be changed by weight, pressure or tension. The deflection from the resting position can be caused by forces exerted during a sucking process, or by a change in the weight due to the fill level. In this embodiment, a force transducer or an acceleration sensor, for example, can be used as the activity sensor. Alternatively, the deflection can be detected by a magnetometer arranged on a part of the mounting bracket that reacts to the magnetic field of a permanent magnet arranged on another part of the mounting bracket. In particular, this enables easy, quantitative measurement of the deflection. The magnetometer can, for example, have an integrated circuit with a Hall sensor.

In the embodiment with a mounting bracket or when the wall holder explained above is used, some elements of the drinking bucket, in particular the activity sensor, the electronic control, the remote data transmission apparatus, the display apparatus, and the subsequently explained operating element and/or the subsequently explained electronics module can be arranged in the mounting bracket or respectively in the wall holder.

In one embodiment, the drinking bucket has an operating element that is connected to the electronic control, wherein the electronic control is configured to, upon actuation of the operating element, change a state of the display apparatus and/or to transfer or transmit information via the remote data transmission apparatus. The operating element can, for example, be a pushbutton or knob or a switch. The operating element can, for example, be used to reset a previously displayed warning signal. Moreover, other entries for the electronic control can also be made, for example in conjunction with a calibration of the fill level sensor.

In one embodiment, the electronic control is configured to determine drinking speed using the sucking activity information and transfer or transmit it with the remote data transmission apparatus and/or display it with the display apparatus. This is possible, for example, using the explained evaluation of weight acting on the drinking bucket, on the basis of the acceleration data, in particular with reference to sucking frequency, or with a fill level sensor. With correspondingly precise detection, the drinking speed can be calculated continuously or averaged over short intervals in time. If the drinking bucket is equipped with an acceleration sensor as described above, the period of time over which livestock suck the teat can be ascertained using the acceleration data in addition to fill level or weight information. The drinking speed associated with this drinking process can then be calculated by evaluating the fill levels/weights at the beginning and at the end of this time period. In this manner, particularly precise information on the drinking speed is obtained that is informative about a specific drinking process. It permits important conclusions about the development and/or health status of the associated livestock.

In one embodiment, the drinking bucket has a lid into which the electronic control and the activity sensor are integrated and into which the remote data transmission apparatus and/or the display apparatus are integrated. To the extent that the drinking bucket has a battery or an operating element, they can also be integrated into the lid. In principle, the aforementioned elements can be attached to the drinking bucket in any arrangement, both inside the holding area as well as on an outside of the drinking bucket. The arrangement in the lid is particularly advantageous because the lid can be exchanged particularly easily as a unit. The lid can accordingly be used very easily with another bucket, for example if a teat is worn out and the entire bucket with the teat has to be exchanged except for the lid. The exchanged drinking bucket can be immediately used again after putting on the lid. Another advantage is that the fill level is very easy to detect with a fill level sensor arranged in the lid. This holds true in particular in conjunction with a distance meter, the "line of sight" of which can be oriented from the lid vertically downward toward the liquid level. An integration of the aforementioned elements in a floor of a drinking bucket is also possible. In this case, fill level detection can be accomplished in particular with an ultrasonic or another acoustic fill level sensor that is directed vertically upward from the floor toward the fill level.

In one embodiment, the electronic control, the activity sensor and the remote data transmission apparatus and/or the display apparatus form a liquid-tight electronics module. Other elements can optionally be integrated into this module, possibly such as the battery and the operating element.

The design as a liquid-tight electronics module protects the contained elements from damage. It also enables very easy exchange, for example in the case of malfunctions. It is also possible to produce the electronics module as an independent unit that can be combined with a conventional drinking bucket. For this, the electronics module can have an attachment apparatus for attaching to a drinking bucket.

In one embodiment, at least one of the described drinking buckets is part of a system that also comprises a truck that has a supply tank for the liquid food and is set up to fill the at least one drinking bucket, wherein the truck has an electronic control unit and a remote data transmission unit for communicating with the remote data transmission apparatus of the at least one drinking bucket. The truck can be in particular a drivable milk truck as described in European patent application EP 1 897 438 A1 by the applicant. In particular, the truck can have a dispensing device by means of which a specifiable amount of liquid can be directly dispensed into the at least one drinking bucket. In an embodiment, the truck is equipped to communicate with the drinking bucket by radio. The fill level or other information detected by the drinking bucket can thus be retrieved directly in the truck, in particular during, before or after a filling process. A particular advantage of this solution is that only a short range is needed for the remote data transmission apparatus of the drinking bucket since the truck or respectively a receiving apparatus, arranged on the truck, of the remote data transmission unit integrated into the truck can be placed a short distance from the drinking bucket. The drinking bucket therefore has a low power consumption and can be operated with a single battery over long periods.

In one embodiment, the electronic control is configured to save information transferred from the at least one drinking bucket and/or forward it to a central feeding management system. Given the possibility of saving the information in the truck, data can be collected from a plurality of drinking buckets during a filling round and then evaluated together. The transmission to the central feeding management system can also be carried out by the remote data transmission unit. It is also possible to use an additional, separate radio apparatus or to employ a connecting cable by means of which the truck is connected to the feeding management system.

In one embodiment, the truck has a display unit, wherein the electronic control is designed to display information transferred from the at least one drinking bucket on the display unit. The display unit can, for example, be a screen, in particular a touchscreen that enables a display of different symbols or text messages. This allows the information transferred from the drinking bucket to be depicted clearly for a user.

BRIEF DESCRIPTION OF THE DRAWINGS

The invention is explained in greater detail below with reference to figures.

DETAILED DESCRIPTION OF THE INVENTION

Figure 1:
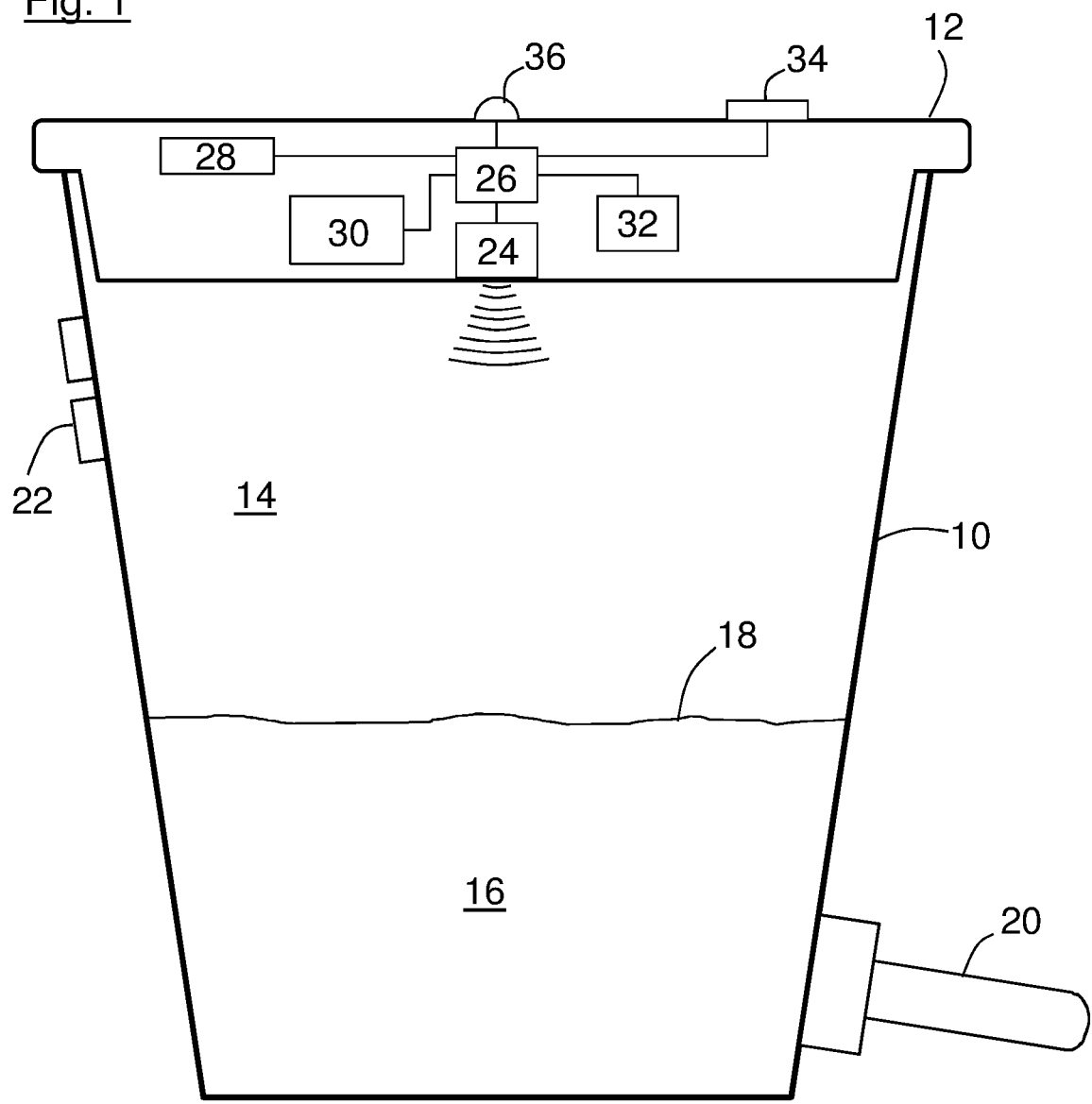
FIG. 1 illustrates is a schematic representation of an embodiment of a drinking bucket.
Figure 2:
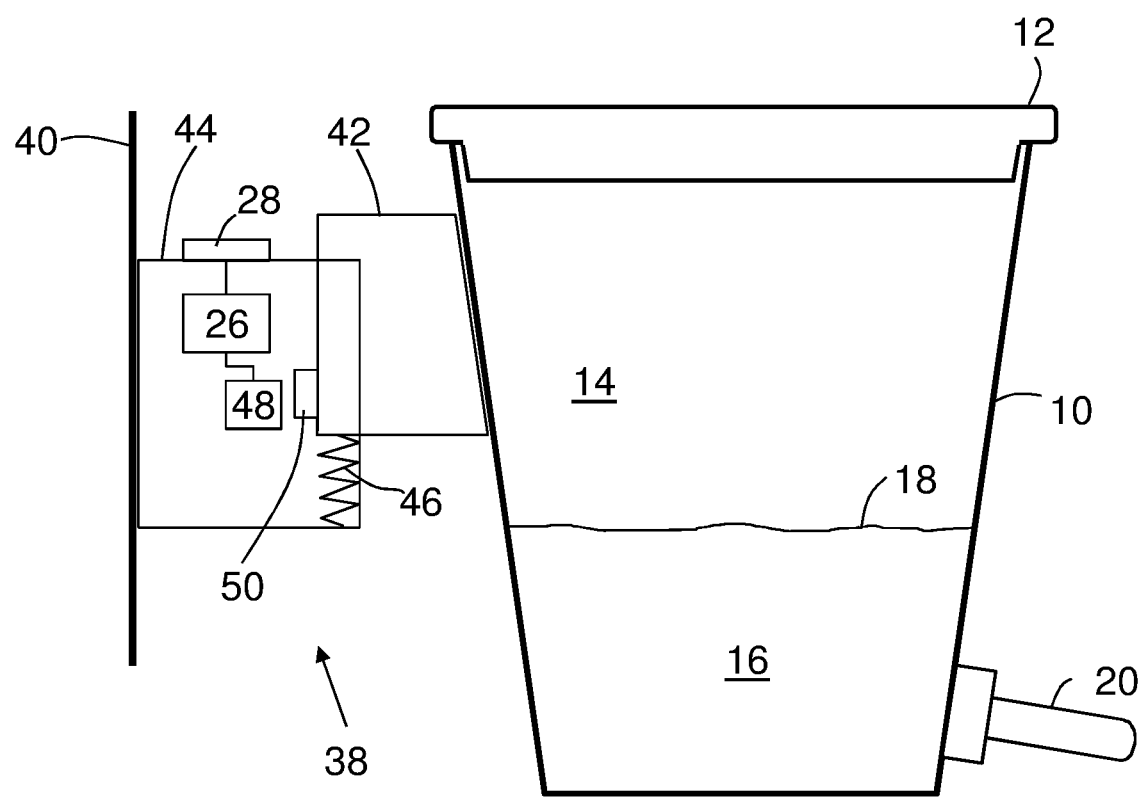
FIG. 2 illustrates a schematic representation of an embodiment of the drinking bucket with a mounting bracket.

Referring to FIGS. 1 and 2, the drinking bucket comprises a bucket-shaped main body 10 that is closed by a lid 12. Within the main body 10, a holding area 14 is configured to hold a liquid food 16. In the example in FIG. 1, the holding area 14 is filled up to a liquid level 18 with the liquid food 16.

At a bottom end of the main body 10, a teat 20 is arranged that is directly connected to the holding area 14 so that livestock can consume the liquid food 16 at any time by sucking the teat 20. At the top end of the main body 10 and opposite the teat 20, an attachment apparatus 22 is configured to attach the drinking bucket to a calf pen.

Still referring to FIG. 1, the lid 12 is substantially disk-shaped and is encapsulated liquid-tight. It contains a fill level sensor 24 as an example of an activity sensor. In the example, it is an optical distance meter, the "line of sight" of which is oriented vertically downward toward the liquid level 18.

The fill level sensor 24 is connected to an electronic control 26. The electronic control 26 is also connected to a remote data transmission apparatus 28. Furthermore, as another example of an activity sensor, an acceleration sensor 32 is connected to the electronic control 26. The remote data transmission apparatus 28 and the electronic control 26 are supplied with electrical energy from a battery 30.

The electronic control 26 evaluates the signals from the fill level sensor 24 and the acceleration sensor 32 and transfers or transmits information on the fill level in the holding area 14, in particular a drinking speed, with the assistance of the remote data transmission apparatus 28 to a central feeding management system (not shown).

Finally, the drinking bucket has a display apparatus 36 in the form of an LED that is arranged on a top side of the lid 12. The display apparatus 36 is connected to the electronic control 26 and serves as a display apparatus 36 for a warning signal. The switch which is also arranged on the top side of the lid 12 is an operating element 34 that is connected to the electronic control 26. In the example, it serves to reset a warning signal.

FIG. 2 shows a drinking bucket that is elastically suspended by a mounting bracket 38 on a wall 40 of a calf pen. The mounting bracket 38 comprises a first part 42 to which the drinking bucket body 10 is attached and a second part 44 that is attached to the wall 40. The first part 42 can be displaced relative to the second part 44 in a vertical direction against the force of a spring 46. This occurs depending on the overall weight of the drinking bucket, i.e., depending in particular on the fill level.

An activity sensor in the form of a magnetometer 48 serves to detect the deflection of the second part 44 relative to the first part 42 from a resting position. As shown in FIG. 2, the magnetometer 48 is attached to the second part 44 and interacts with a permanent magnet 50 attached to the first part 42. Referring to the embodiment in FIG. 1, the activity sensor is connected to an electronic control 26 that for its part is connected to a remote data transmission apparatus 28. As shown in FIG. 2, these elements are arranged in the mounting bracket 38 and do not differ in terms of their function from the exemplary embodiment in FIG. 1.

LIST OF REFERENCE NUMBERS USED

10 Main body
12 Lid
14 Holding area
16 Liquid food
18 Liquid level
20 Teat
22 Attachment apparatus
24 Fill level sensor 26 Electronic control
28 Remote data transmission apparatus
30 Battery
32 Acceleration sensor
34 Operating element
36 Display apparatus
38 Mounting bracket
40 Wall
42 First part
44 Second part
46 Spring
48 Magnetometer
50 Permanent magnet

The invention claimed is:

1. A drinking bucket for feeding livestock a liquid food, the drinking bucket comprising:
   a holding area configured to hold the liquid food and further configured to couple to at least one teat;
   an activity sensor configured to detect sucking activity on the at least one teat;
   an electronic control connected to the activity sensor and configured to evaluate signals from the activity sensor to obtain activity information; and
   at least one of a remote data transmission apparatus configured to transmit the activity information obtained from the electronic control and a display apparatus configured to display the activity information obtained from the electronic control, wherein the electronic control is connected to the at least one of a remote data transmission apparatus and the display apparatus.

2. The drinking bucket according to claim 1, further comprising a battery configured to supply power to the electronic control and the at least one of the remote data transmission apparatus and the display apparatus.

3. The drinking bucket according to claim 1, wherein the activity sensor is a fill level sensor configured to detect a fill level of the liquid food in the holding area.

4. The drinking bucket according to claim 3, wherein the fill level sensor comprises a distance meter.

5. The drinking bucket according to claim 1, wherein the activity sensor is an acceleration sensor.

6. The drinking bucket according to claim 1, wherein the activity sensor is a force transducer.

7. The drinking bucket according to claim 1, further comprising a mounting bracket configured to elastically suspend the drinking bucket in a resting position, and wherein the activity sensor is configured to detect a deflection of the drinking bucket from the resting position.

8. The drinking bucket according to claim 1, further comprising an operating element that is connected to the electronic control, wherein the operating element is configured to actuate, and wherein the actuation of the operating element initiates at least one of a state change of the display apparatus and a transmission of information via the remote data transmission apparatus.

9. The drinking bucket according to claim 1, wherein the electronic control is configured to determine drinking speed using the activity information.

10. The drinking bucket according to claim 9, wherein the at least one of the display apparatus is configured to display the drinking speed and the remote data transmission apparatus is configured to transmit the drinking speed.

11. The drinking bucket according to claim 1, further comprising a lid, wherein the electronic control, the activity sensor, and the at least one of the remote data transmission apparatus and the display apparatus are integrated into the lid.

12. The drinking bucket according to claim 1, wherein the electronic control, the activity sensor, and the at least one of the remote data transmission apparatus and the display apparatus comprise a liquid-tight electronics module.

13. A drinking bucket system comprising:
   at least one drinking bucket comprising,
      a holding area configured to hold liquid food and further configured to attach to at least one teat,
      an activity sensor for detecting sucking activity on the at least one teat,
      an electronic control connected to the activity sensor and configured to evaluate signals from the activity sensor to obtain information, and
      a remote data transmission apparatus; and
   a truck configured to fill the at least one drinking bucket, the truck comprising,
      a supply tank for the liquid food,
      an electronic control unit, and
      a remote data transmission unit configured to communicate with the remote data transmission apparatus of the at least one drinking bucket.

14. The drinking bucket system according to claim 13, wherein the electronic control unit is configured to save information transferred from the at least one drinking bucket and forward it to a central feeding management system.

15. The drinking bucket system according to claim 13, wherein the truck further comprises a display unit configured to display information transmitted from the remote data transmission apparatus of the at least one drinking bucket.

* * * * *